Figure 1:
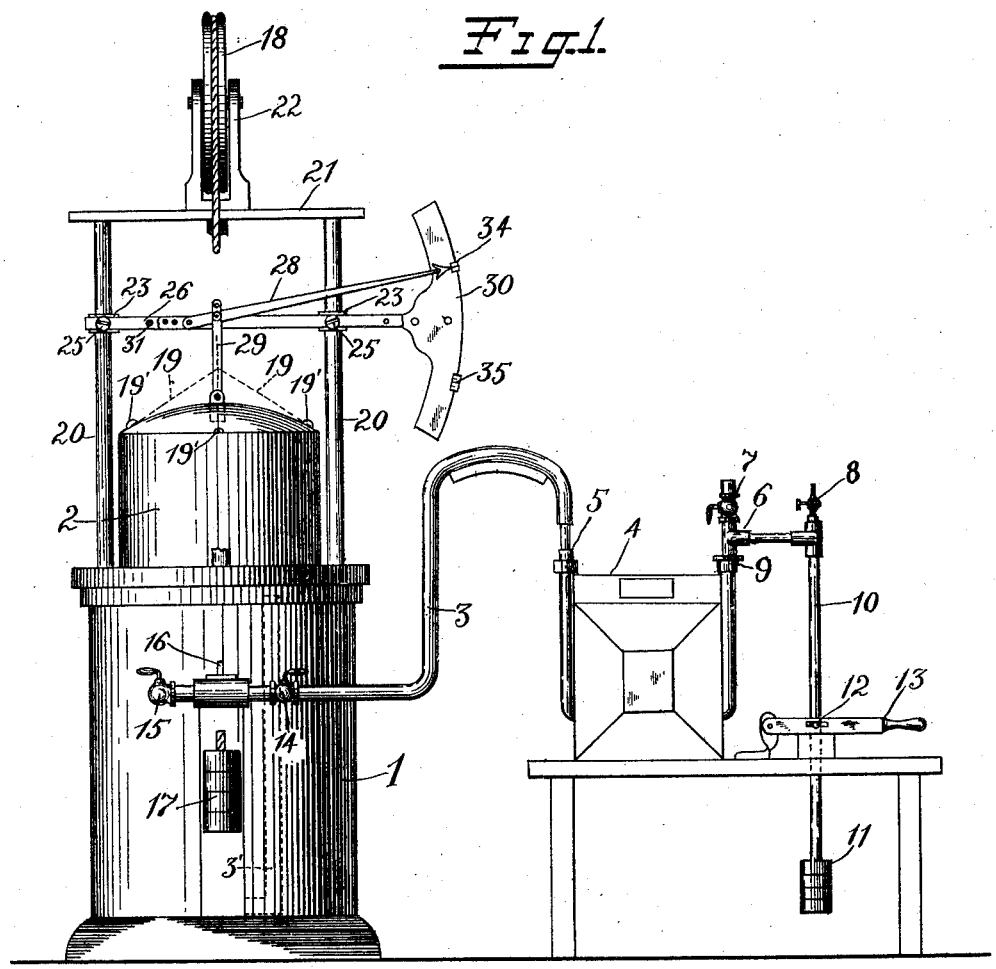

R. L. DEZENDORF.
METER PROVER.
APPLICATION FILED JAN. 25, 1909.

964,956.

Patented July 19, 1910.
2 SHEETS—SHEET 1.

Witnesses:
Fred M. Dannenfelser.
Alice Murford

Inventor
R. L. DEZENDORF.
By his Attorneys

R. L. DEZENDORF.
METER PROVER.
APPLICATION FILED JAN. 25, 1909.
964,956.
Patented July 19, 1910.
2 SHEETS—SHEET 2.
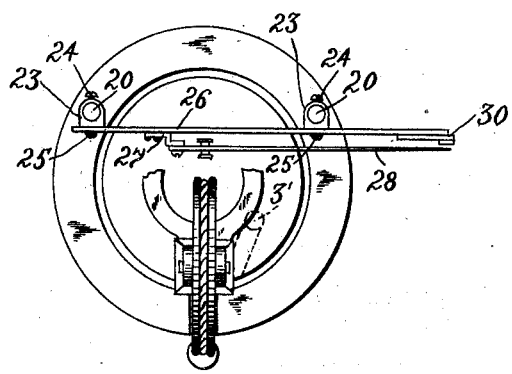
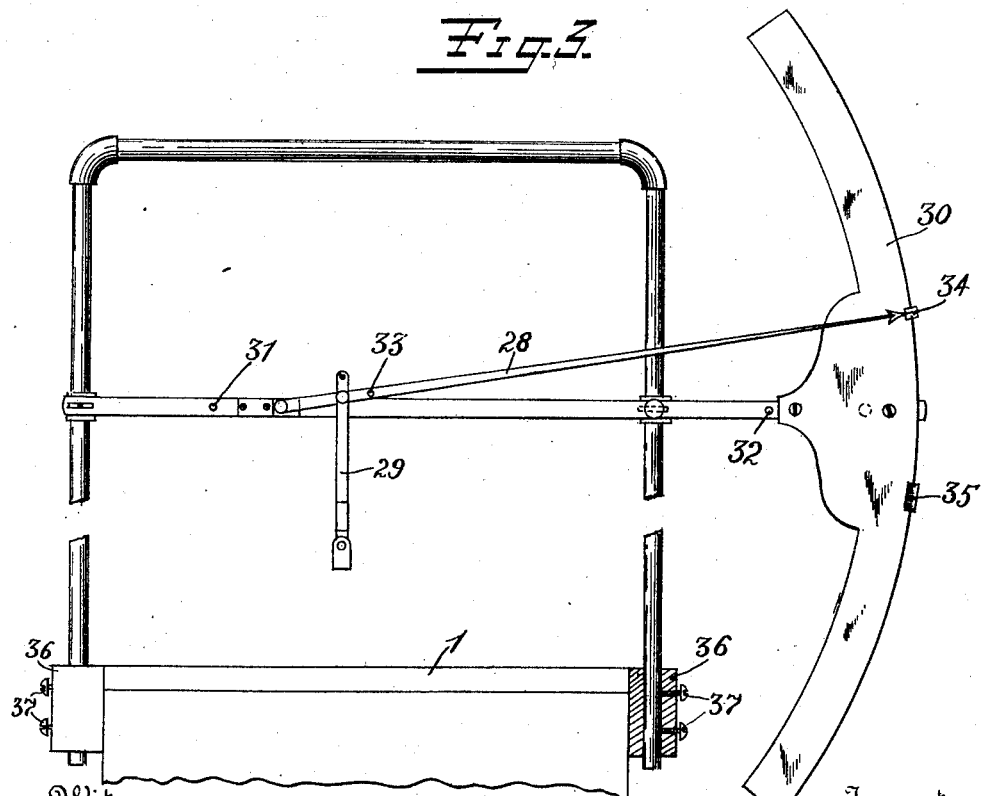
Witnesses:
Fred M. Dannenfelser.
Alice Morford.
Inventor
R. L. DEZENDORF.
By his Attorneys.

UNITED STATES PATENT OFFICE.

RICHARD L. DEZENDORF, OF RICHMOND HILL, NEW YORK, ASSIGNOR TO AMERICAN METER COMPANY, OF NEW YORK, N. Y., A CORPORATION OF NEW YORK.

METER-PROVER.

964,956.  Specification of Letters Patent.  Patented July 19, 1910.

Application filed January 25, 1909. Serial No. 473,975.

*To all whom it may concern:*

Be it known that I, RICHARD L. DEZENDORF, a citizen of the United States, residing at Richmond Hill, borough of Queens, State of New York, have invented certain new and useful Improvements in Meter-Provers, of which the following is a full, clear, and exact description.

My invention relates to improvements in meter provers and has for its object to provide a meter prover whereby meters may be proved on a single revolution of the tangent, if desired, resulting in a very considerable saving of time and which will prove meters with accuracy and certainty, and consists in the features hereinafter described and particularly pointed out in the claims.

The following is a description of the embodiment of my invention, reference being had to the accompanying drawings, in which, Figure 1 shows a side elevation of the apparatus including a meter to be proved. Fig. 2 is a plan view of the proving bell and indicator, and Fig. 3 shows the scale with its support and pointer on an enlarged scale with a modified form of standard.

Referring more particularly to the drawings, 1 is the ordinary tank of a meter prover containing water or other suitable liquid, in which the bell 2 is adapted to be more or less submerged.

3 is a flexible pipe leading from the usual stand pipe 3′ within the bell 2 to the meter 4 and is connected thereto by a suitable coupling 5.

Attached to the outlet of the meter is a coupling 6 provided with a large valve 7 and a small valve 8, the large valve 7 being of a capacity a trifle less than the capacity of the meter and the small valve 8 controlling a port with a constricted orifice being the standard orifice prescribed by law for meter proving.

The coupling 6 is provided with a rubber washer 9, which when forced down over the meter outlet forms an air tight closure. Connected to the coupling by the rod 10 is a weight 11. The rod 10 is pivotally connected at 12 to a lever 13 so that the rod together with the weight and coupling 6 can be lifted by raising the outer end of the lever 13 so as to be detached from the meter and when lowered so as to engage the meter it is held in position by the weight 11.

14 is a valve in the pipe 3 closing that pipe when desired.

15 is a valve adapted to be connected to a source of air pressure for admitting air under pressure to the bell for raising the same when desired.

16 is an air valve whereby air can be admitted to the bell when desired when the bell is being raised by hand. The bell is counter-balanced by counter weight 17 supported by a chain passing over the pulley 18 and connected to the chains 19 connected to the lugs 19′ at the top of the bell.

20—20 are standards connected to the tank 1 and supporting the spider 21, on which the pulley 18 is mounted in bearings 22. To the standards 20—20 are connected vertically adjustable collars 23, same being secured in position by set screws 24. To these collars screws 25 connect a bar 26 carrying a support 27 to which is pivoted a pointer 28. This pointer 28 is connected to the bell 2 by an arm 29 pivoted thereto. The outer end of the pointer 28 travels over a scale 30 which is carried by the bar 26.

The bar 26 is provided with holes 31 and 32 whereby the support 27 and the scale 30 can be adjusted to different positions on the bar 25. The pointer 28 has a hole 33 so that the position of the arm 29 to the pointer 28 can be changed when the position of the standard 27 and scale 30 are changed. Such changes result in a change in the movement of the pointer 28 for a given change in position of the bell 2.

Upon the scale 30 are adjustable clips 34, 35, the first having a single line indicating the position at starting the test. Clip 35 has a series of marks, one of which is the correct finishing mark while the others enable the accurate reading of and difference between the actual indication given by the pointer and what would be the correct indication.

In testing meters by the apparatus above described, it is to be noted that the air passing through the meter is controlled by cocks on the outlet side of the meter, one being a large cock and the other a cock controlling a standard testing orifice. In testing the top of the meter is removed so as to disclose the tangent. The bell 2 is first filled with air, being lifted so that the pointer 28 is raised to some point on the scale 30 considerably above the mark 34.

The air is then discharged through the meter using the large port controlled by the cock 7 until the pointer of the proving device reaches the starting point on the clip 34. The valve 7 is then closed. The position of the tangent is then observed and indicated by a mark upon the meter. The large port is then opened by the valve 7 and the meter is permitted to run until the tangent makes one complete revolution. A note is taken of the distance traveled by the pointer 28. The bell 2 is again raised and the operation is repeated, using the small orifice controlled by the valve 8 as an outlet, and the distance traveled by the pointer 28 for one complete revolution of the tangent is again noted. This operation is repeated and the necessary changes in the adjustments of the tangent and valves are made until the pointer 28 shows that the meter is properly adjusted and until the meter registers accurately with both the large and small port. After that the top of the meter is soldered on; the meter is painted up and is ready for installation. In making each of these tests with the large and small port only one revolution of the tangent is necessary for each such test. If desired, the clips 34 and 35 may be adjusted so that their positions correspond to a plurality of revolutions of the tangent, although with my apparatus, I have found that perfect accuracy may be obtained when only one revolution of the tangent is permitted. By using a large bell 2 as shown such a plurality of revolutions can be secured, if desired. The device also permits of testing the meter by introducing a small amount of air in the bell sufficient only to produce one or a trifle more than one revolution of the tangent. By using such a small amount of air, difficulties heretofore experienced on account of the expansion and contraction of air within the bell, which when the amount within the bell is considerable, is liable to introduce error, can be avoided.

By having the air which passes through the meter controlled by cocks upon the outlet port of the meter, the internal and external pressures upon the diaphragms of the meters always conform to those which would be found under the conditions of actual use. The fulcrum of the pointer can be varied and the scale moved in and out so as to adjust the apparatus to meters of different capacities. The distance of the bell from the pointer can be also adjusted if it is found desirable to have the bell at the highest possible elevation.

The indicator marks upon the proving scale could be adjusted by moving the clips so that the indicating device can be adapted to meter provers having bells of different diameters.

The indicating device is direct reading and there is no lost motion in any part between the bell and the pointer. The bar 25 carrying the scale is connected to the uprights by adjustable collars and is connected to those collars by screws passing through elongated openings permitting a slight adjustment in all directions. If desired, an auxiliary frame, such as shown in Fig. 3, may be connected to the holder 1 for supporting the scale and the pointer if desired, sockets 36 with set screws 37 being provided for the lower ends thereof. The connection between the bell and the pointer is directly over a portion of the bell and so near its center as not to interfere with the action of the bell in any way.

What I claim is:

1. In a meter prover, the combination of a tank adapted to contain water, a bell within said tank, an outlet for said bell adapted to be coupled to a meter, an indicating device consisting of a stationary scale and a pointer mounted on a fixed fulcrum, said pointer being pivotally connected to said bell at a point near said fulcrum and remote from the free end of said pointer so as to avoid lost motion, supporting uprights connected to said tank and a vertically adjustable bar connected to said uprights and carrying said scale and said fulcrum of said pointer.

2. In a meter prover, the combination of a tank adapted to contain water, a bell within said tank, an outlet for said bell adapted to be coupled to a meter, an indicating device consisting of a stationary scale and a pointer mounted on a fixed fulcrum, said pointer being pivotally connected to said bell at a point near said fulcrum and remote from the free end of said pointer so as to avoid lost motion, supporting uprights carried by said tank, adjustable collars upon said uprights and a bar secured to said collars and carrying said scale, and also the fulcrum of said pointer.

3. In a meter proving device, the combination of a tank adapted to contain water, a bell within said tank, a multiplying indicating device consisting of a scale and a pointer, one of which members is connected to said bell, the connection of said bell with the moving member being near to said fulcrum and remote from the free end of said moving device, a coupling adapted to be connected to the outlet port of said meter, said coupling having a constricted port, a cock controlling said constricted port, and also a second port of slightly less capacity than the capacity of said meter, and a cock controlling said second port.

4. In a meter proving device, the combination of a tank adapted to contain water, a bell within said tank, a multiplying indicating device consisting of a scale and a pointer, one of which members is pivotally connected to said bell and to a stationary fulcrum, the connection of said bell with the moving member being near to said fulcrum and remote from the free end of said moving device, a coupling adapted to be connected to the outlet port of said meter, said coupling having a constricted port, and also a second port of slightly less capacity than the capacity of said meter, and means for closing and opening said constricted and second ports.

RICHARD L. DEZENDORF.

Witnesses:
ALICE MORFORD,
M. E. GARRETT.